(12) United States Patent
Lee et al.

(10) Patent No.: US 10,601,089 B2
(45) Date of Patent: Mar. 24, 2020

(54) BATTERY MODULE

(71) Applicant: LG Chem, Ltd., Seoul (KR)

(72) Inventors: Jung-Hoon Lee, Daejeon (KR);
Jeong-O Mun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 96 days.

(21) Appl. No.: 15/744,047

(22) PCT Filed: Mar. 10, 2017

(86) PCT No.: PCT/KR2017/002649
§ 371 (c)(1),
(2) Date: Jan. 11, 2018

(87) PCT Pub. No.: WO2017/160029
PCT Pub. Date: Sep. 21, 2017

(65) Prior Publication Data
US 2018/0205124 A1 Jul. 19, 2018

(30) Foreign Application Priority Data
Mar. 16, 2016 (KR) .......................... 10-2016-0031557

(51) Int. Cl.
| | |
|---|---|
| *H01M 2/10* | (2006.01) |
| *H01M 10/647* | (2014.01) |
| *H01M 2/02* | (2006.01) |
| *H01M 10/613* | (2014.01) |
| *H01M 10/625* | (2014.01) |
| *H01M 10/6567* | (2014.01) |

(52) U.S. Cl.
CPC ....... *H01M 10/647* (2015.04); *H01M 2/0237* (2013.01); *H01M 2/10* (2013.01);
(Continued)

(58) Field of Classification Search
CPC ............ H01M 2/02; H01M 2/12; H01M 2/10; H01M 10/647; H01M 10/613
See application file for complete search history.

(56) References Cited

U.S. PATENT DOCUMENTS

| | | | |
|---|---|---|---|
| 7,547,487 B1 * | 6/2009 | Smith ................. | H01M 2/0242 429/100 |
| 2009/0233158 A1 | 9/2009 | Kimura | |

(Continued)

FOREIGN PATENT DOCUMENTS

| | | |
|---|---|---|
| JP | S54 8262 A | 4/1979 |
| JP | H02-32515 A | 2/1990 |

(Continued)

OTHER PUBLICATIONS

International Search Report for Application No. PCT/KR2017/002649, dated Jun. 28, 2017 (5 Pages).

*Primary Examiner* — Kenneth J Douyette
(74) *Attorney, Agent, or Firm* — Morgan, Lewis & Bockius LLP (57) ABSTRACT

The present disclosure discloses a battery module having high safety and energy density while having stably cooling efficiency. The battery module of the present disclosure includes: a plurality of pouch-type secondary batteries standing in a vertical direction and stacked in a horizontal direction; a module case configured to accommodate the plurality of secondary batteries in an inner space thereof; a lower filling liquid filled in a lower region of the inner space of the module case and making contact with at least lower portions of the plurality of secondary batteries; and an upper filling liquid having a specific gravity less than a specific gravity of the lower filling liquid and filled in the inner space of the module case above the lower filling liquid.

15 Claims, 5 Drawing Sheets

(52) U.S. Cl.
CPC ....... *H01M 2/1077* (2013.01); *H01M 10/613* (2015.04); *H01M 10/625* (2015.04); *H01M 10/6567* (2015.04); *H01M 2220/20* (2013.01)

(56) References Cited

U.S. PATENT DOCUMENTS

2010/0112429 A1* 5/2010 Murata ............... H01M 10/625 429/120
2012/0308864 A1 12/2012 Meintschel et al.

FOREIGN PATENT DOCUMENTS

| | | |
|---|---|---|
| JP | 2002-106346 A | 4/2002 |
| JP | 2003-346924 A | 12/2003 |
| JP | 2007-019327 A | 1/2007 |
| JP | 2008-130489 A | 6/2008 |
| JP | 2008-204765 A | 9/2008 |
| JP | 2008-251304 A | 10/2008 |
| JP | 2009-117086 A | 5/2009 |
| JP | 2009-254042 A | 10/2009 |
| JP | 2009-289610 A | 12/2009 |
| JP | 2010-146883 A | 7/2010 |
| JP | 2012-241940 A | 12/2012 |
| JP | 2012-252959 A | 12/2012 |
| JP | 2013-011272 A | 1/2013 |
| JP | 2013-051100 A | 3/2013 |
| JP | 2013-507744 A | 3/2013 |
| JP | 2015-018790 A | 1/2015 |
| JP | 2015-032508 A | 2/2015 |
| JP | 2015-207437 A | 11/2015 |
| WO | 2017/028033 A1 | 2/2017 |

* cited by examiner

BATTERY MODULE

TECHNICAL FIELD

The present application claims priority under 35 U.S.C. § 119 to Korean Patent Application No. 10-2016-0031557 filed on Mar. 16, 2016 in the Republic of Korea, and under 35 U.S.C. § 365 to PCT/KR2017/002649 filed on Mar. 10, 2017, the disclosure of which is incorporated herein by reference.

The present disclosure relates to a battery module, and more particularly, to a battery module guaranteeing excellent cooling efficiency, safety, and high energy density, and a battery pack and an automobile including the battery module.

BACKGROUND ART

In recent years, there has been an increasing demand for portable electronic products such as laptop computers, smartphones, and smartwatches, and the development of devices such as energy storage batteries, robots, and satellites has begun in earnest. Along with this, research into high-performance secondary batteries that can be repeatedly charged and discharged has been more actively conducted.

Examples of currently commercialized secondary batteries include nickel-cadmium batteries, nickel-metal hydride batteries, nickel-zinc batteries, and lithium secondary batteries. Among such various secondary batteries, lithium secondary batteries are freely rechargeable because of having substantially no memory effect compared with nickel-based secondary batteries, and have a very low self-discharge rate and high energy density. Owing to these merits, there has been high interest in lithium secondary batteries.

In general, lithium secondary batteries use a lithium-based oxide as a positive electrode active material and a carbonaceous material as a negative electrode active material. A lithium secondary battery may include: an electrode assembly in which a positive electrode plate coated with such a positive electrode active material and a negative electrode plate coated with such a negative electrode active material are disposed with a separator therebetween; and an exterior, that is, a battery case, in which the electrode assembly and an electrolytic solution are sealed.

In general, according to exterior types, lithium secondary batteries may be classified into a can type in which an electrode assembly is accommodated in a metal can, and a pouch type in which an electrode assembly is accommodated in a pouch formed of an aluminum laminate sheet.

In recent years, secondary batteries have been widely used not only in small-sized devices such as portable electronic devices, but also in medium to large-sized devices such as automobiles or power storage devices. In particular, along with the depletion of carbon energy and the increasing interest in the environment, there has been worldwide interest in hybrid vehicles and electric vehicles in countries such as the USA, Europe, Japan, and Korea. The core component of such a hybrid or electric vehicle is a battery pack providing driving power to a vehicle motor. Since hybrid or electric vehicles can have driving power via charging and discharging of battery packs, hybrid or electric vehicles have high fuel efficiency and emit no pollutants or less pollutants compared to vehicles only using engines, and thus the use of hybrid or electric vehicles has been gradually and markedly increased.

Most battery modules, particularly, middle to large-sized battery modules for hybrid vehicles, electric vehicles, or energy storage systems (ESSs) include a plurality of secondary batteries, and the plurality of secondary batteries are connected in series and/or parallel with each other for high capacity and power. In addition, pouch-type secondary batteries are generally used in middle to large-sized battery modules because the pouch-type secondary batteries are easy to stack and are light, and a large number of pouch-type secondary batteries can be included in one battery pack.

As the amount of use or application fields of batteries increases along with a large increase in the capacity and output power of batteries, batteries are required to have various characteristics.

A typical one of such characteristics may be cooling performance for effectively cooling battery modules. In particular, the cooling of a battery module in which a plurality of secondary batteries are densely included is a very important task. Secondary batteries may be used in a high-temperature environment such as summer and may generate a large amount of heat by themselves. In this case, if a plurality of secondary batteries are stacked on one another, the temperature of the plurality of secondary batteries may further increase. However, this high temperature may lower the performance of the secondary batteries and even may cause fires or explosions.

In addition, another required characteristic may be the safety of batteries. In particular, battery modules may catch on fire because of various causes such as overcharging, overdischarging, or penetration by acicular parts. In this case, if the fire is not extinguished in the early stage, the battery modules may explode, or the fire may spread to other devices such as automobiles. This may cause severe loss of property and lives.

In addition, another characteristic necessary for batteries may be improved energy density. A secondary battery is a part of a battery module contributing to an increase in energy, and thus if parts other than the secondary battery occupy a large space in the battery module, the output power or capacity of the battery module may decrease even though the volume of the battery module increases. Therefore, in this case, the battery module may have low energy density, and thus it may be difficult to decrease the size of the battery module or improve the capacity or output power of the battery module.

DISCLOSURE

Technical Problem

The present disclosure is designed to solve the above-described problems, and therefore the present disclosure is directed to providing a battery module having high safety and high energy density while securing stable cooling performance, and a battery pack and an automobile including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

To achieve the above-described objectives, a battery module of the present disclosure includes: a plurality of pouch-type secondary batteries standing in a vertical direction and stacked in a horizontal direction; a module case configured to accommodate the plurality of secondary batteries in an inner space thereof; a lower filling liquid filled in a lower region of the inner space of the module case and making contact with at least lower portions of the plurality of secondary batteries; and an upper filling liquid having a specific gravity less than a specific gravity of the lower filling liquid and filled in the inner space of the module case above the lower filling liquid.

Here, the lower filling liquid may have thermal conductivity higher than thermal conductivity of the upper filling liquid.

In addition, the lower filling liquid may have a thermal conductivity of 0.5 W/m·K or greater.

In addition, the upper filling liquid may have a specific heat greater than a specific heat of the lower filling liquid.

In addition, the upper filling liquid may have a specific heat of 2000 J/kg·K or greater.

In addition, the upper filling liquid may have a burning point higher than a burning point of the lower filling liquid.

In addition, the upper filling liquid may have a burning point of 300° C. or higher.

In addition, the upper filling liquid may have a withstand voltage higher than a withstand voltage of the lower filling liquid.

In addition, electrode leads of the secondary batteries may be entirely immersed in the upper filling liquid.

In addition, the secondary batteries may be stacked in such a manner that adjacent secondary batteries may face each other and make contact with each other.

In addition, an introduction groove lengthily extending in a length direction of the secondary batteries may be formed in a bottom surface of the module case, and the lower filling liquid may be filled in the introduction groove of the module case In addition, the module case may have a boundary protrusion formed on an inner lateral surface in an inwardly convex shape, and the boundary protrusion may be located on a boundary between the lower filling liquid and the upper filling liquid.

In addition, to achieve the above-described objectives, a battery pack of the present disclosure includes the battery module of the present disclosure.

In addition, to achieve the above-described objectives, an automobile of the present disclosure includes the battery module of the present disclosure.

Advantageous Effects

According to the present disclosure, liquids having different specific gravities, and thermal conductivities, specific heats, burning points, and/or withstand voltages are filled in upper and lower regions of the inner space of the battery module. Thus, all the effects of improving the cooling efficiency, safety, and energy density of the battery module may be achieved.

First, according to an aspect of the present disclosure, the cooling efficiency of the battery module may be stably guaranteed.

In particular, according to an embodiment of the present disclosure, a filling liquid having high thermal conductivity is filled in a lower region of the inner space of the battery module so that heat may be discharged from the secondary batteries of the battery module to the outside of the battery module. Therefore, in this case, the battery module may be effectively cooled.

In addition, according to an aspect of the present disclosure, the energy density of the battery module may be improved.

In particular, according to the present disclosure, all the secondary batteries of the battery module may be cooled using the lower filling liquid of the battery module, and thus cooling members such as cooling fins required in the related art may not be additionally provided between the secondary batteries. Therefore, the size of the battery module may be reduced or the sizes of the secondary batteries may be increased to an extent corresponding to a space occupied by such cooling fins of the related art.

In addition, according to an aspect of the present disclosure, the safety of the battery module may be effectively guaranteed.

In particular, according to the present disclosure, a filling liquid having a high specific heat, burning point, and/or withstand voltage is filled in an upper region of the inner space of the battery module, and thus the battery module may be effectively prevented from increasing in temperature, catching on fire, and/or undergoing insulation breakdown.

DESCRIPTION OF DRAWINGS

The accompanying drawings illustrate preferred embodiments of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
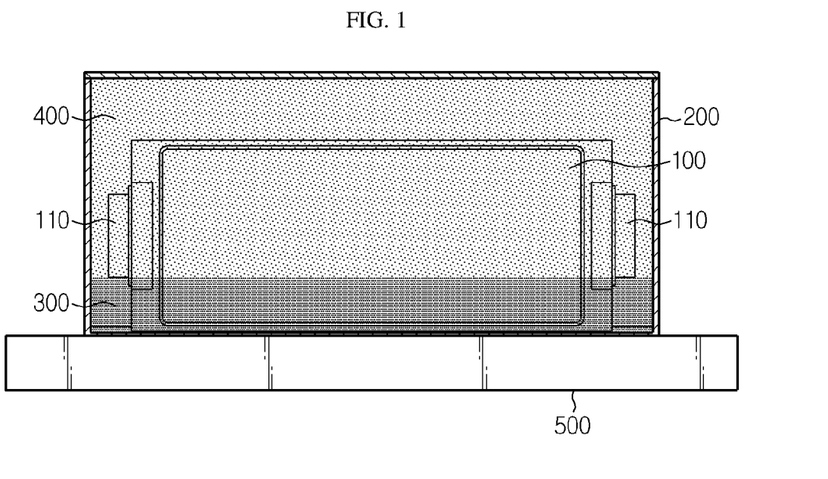
FIG. 1 is a cross-sectional view schematically illustrating a configuration of a battery module according to an embodiment of the present disclosure.

FIG. 1 is a cross-sectional view schematically illustrating a configuration of a battery module according to an embodiment of the present disclosure.

Referring to FIG. 1, the battery module of the present disclosure may include a secondary battery 100, a module case 200, a lower filling liquid 300, and an upper filling liquid 400.

The secondary battery 100 may be configured by accommodating an electrode assembly and an electrolyte in an exterior, so as to perform charging and discharging operations. In particular, the secondary battery 100 may be a pouch-type secondary battery. The pouch-type secondary battery may include an electrode assembly, an electrolyte, and a pouch-type exterior.

The electrode assembly may be formed by arranging at least one positive electrode plate and at least one negative electrode plate with a separator therebetween. More specifically, examples of the electrode assembly includes a wound-type electrode assembly in which one positive electrode plate and one negative electrode plate are wound together with a separator, and a stacked-type electrode assembly in which a plurality of positive electrode plates and a plurality of negative electrode plates are alternately stacked with separators therebetween.

In addition, the pouch-type exterior may include an external insulating layer, a metal layer, and an internal adhesive layer. The pouch-type exterior may include a thin metal film such as a thin aluminum film for protecting internal components such as the electrode assembly and the electrolyte, complementing the electrochemical properties of the electrode assembly and the electrolyte, and guaranteeing heat dissipation. In addition, the thin aluminum film may be placed between insulating layers formed of an insulating material, so as to electrically insulate internal components of the secondary battery 100 such as the electrode assembly and the electrolyte from other components located outside the secondary battery 100.

In particular, the pouch-type exterior may include two pouches, for example, a left pouch and a right pouch, and a concave inner space may be formed in at least one of the two pouches. The electrode assembly and the electrolyte may be accommodated in the inner space of the pouches. In addition, sealing portions may be provided on peripheral surfaces of the two pouches, and these sealing portions may be fused to each other to seal the inner space in which the electrode assembly and the electrolyte are accommodated.

The pouch-type secondary battery may include electrode leads 110, and the electrode leads 110 may include a positive electrode lead and a negative electrode lead. Here, each of the electrode leads 110 may have a plate shape and may be exposed to the outside in a state in which the electrode leads 110 are placed between the two pouches, so as to function as electrode terminals of the secondary battery 100.

According to an aspect of the present disclosure, the battery module may include various pouch-type secondary batteries known at the time of filing the present application.

The battery module of the present disclosure may include a plurality of pouch-type secondary batteries 100. This will be described in more detail with reference to FIG. 2.

Figure 2:
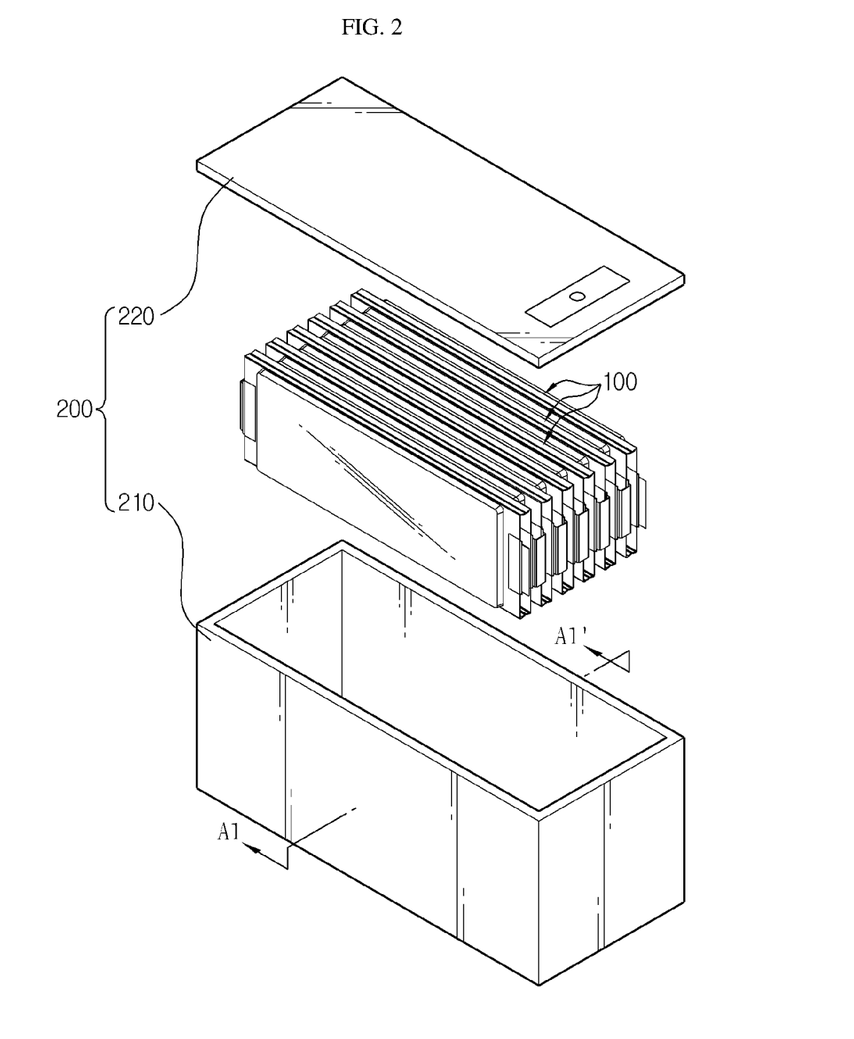
FIG. 2 is an exploded perspective view schematically illustrating a configuration of the battery module according to an embodiment of the present disclosure.

FIG. 2 is an exploded perspective view schematically illustrating a configuration of the battery module according to an embodiment of the present disclosure.

Referring to FIG. 2, a plurality of such pouch-type secondary batteries 100 may be included in the battery module and may be stacked in at least one direction. In particular, the plurality of pouch-type secondary batteries 100 may be stacked in a horizontal direction in a state in which the pouch-type secondary batteries 100 stand vertically. That is, each of the pouch-type secondary batteries 100 may stand in a direction perpendicular to the ground such that two large surfaces of the pouch-type secondary battery 100 may be placed at left and right sides, and sealing portions of the pouch-type secondary battery 100 may be placed at upper, lower, front, and rear sides. In addition, the secondary batteries 100 placed in a standing position as described above may be arranged in parallel to each other in a left-to-right direction such that large surfaces of adjacent secondary batteries 100 may face each other.

The module case 200 may have an empty inner space and may accommodate the plurality of secondary batteries 100, the lower filling liquid 300, and the upper filling liquid 400.

For example, as shown in FIG. 2, the module case 200 may include a lower case 210 having an approximately rectangular parallelepiped shape and an upper cover 220 having an approximately plate shape. In this case, the plurality of secondary batteries 100 stacked on each other, the lower filling liquid 300, and the upper filling liquid 400 may be accommodated in an inner space of the lower case 210. In addition, the upper cover 220 may cover an upper opened portion of the lower case 210 in a state in which the secondary batteries 100 are accommodated in the lower case 210, so as to seal the lower case 210. In this case, the lower filling liquid 300 and the upper filling liquid 400 may be introduced into the inner space of the lower case 210 through a predetermined opening in a state in which the lower case 210 and the upper cover 220 are coupled to each other.

Particularly, in the battery module of the present disclosure, since liquids, that is, the lower filling liquid 300 and the upper filling liquid 400 are filled in the module case 200, it is important to seal the module case 200. To this end, the lower case 210 and the upper cover 220 may be coupled to each other by various methods. For example, the lower case 210 and the upper cover 220 may be coupled to each other by a method such as a laser welding method. In addition, a sealing member such as rubber may be provided between coupling portions of the lower case 210 and the upper cover 220 so as to improve sealing therebetween.

The lower filling liquid 300 and the upper filling liquid 400 are liquid and may both be filled in the inner space of the module case 200. In this case, the lower filling liquid 300 and the upper filling liquid 400 may not be filled in separate compartments of the inner space of the module case 200 but may be filled in the same inner space of the module case 200. However, the lower filling liquid 300 and the upper filling liquid 400 may be placed in different regions of the inner space of the module case 200 because the lower filling liquid 300 and the upper filling liquid 400 have different specific gravities. That is, the lower filling liquid 300 may have a specific gravity greater than that of the upper filling liquid 400. Therefore, the lower filling liquid 300 may be filled in a lower region of the inner space of the module case 200. Since the upper filling liquid 400 has a specific gravity less than that of the lower filling liquid 300, the upper filling liquid 400 may be filled in the module case 200 above the lower filling liquid 300.

Here, the configuration in which two kinds of liquids having different specific gravities are filled as filling liquids in two layers of the inner space of the module case 200 is mainly described. However, this configuration is an example, and various other examples may be possible. For example, three or more kinds of liquids having different specific gravities may be filled as filling liquids in three or more layers of the inner space of the module case 200.

According to the battery module of the present disclosure, the lower filling liquid 300 and the upper filling liquid 400 may coexist in a pack case. In this case, the lower filling liquid 300 and the upper filling liquid 400 may be placed around the secondary batteries 100, and thus the cooling efficiency and safety of the battery module may be improved owing to different characteristics of the lower filling liquid 300 and the upper filling liquid 400.

Particularly, in the battery module of the present disclosure, the lower filling liquid 300 may be in contact with at least a portion of a secondary battery 100.

For example, the lower filling liquid 300 may be in contact with at least a lower portion of the secondary battery 100 as shown in FIG. 1. In addition, the lower filling liquid 300 may be in contact with lower portions of all the plurality of secondary batteries 100 accommodated in the module case 200.

In the module case 200, the plurality of secondary batteries 100 may be horizontally arranged side by side in a vertically standing posture. Therefore, all the secondary batteries 100 may be in contact with the lower filling liquid 300 filled in a lower portion of the module case 200.

Preferably, the lower filling liquid 300 may have thermal conductivity greater than that of the upper filling liquid 400. In particular, the lower filling liquid 300 may include a material having a thermal conductivity of 0.5 W/m·K or greater at room temperature.

According to this configuration of the present disclosure, since the lower filling liquid 300 has high thermal conductivity, the lower filling liquid 300 may absorb heat from the secondary batteries 100 and discharge the heat to the outside. In particular, the lower filling liquid 300 may be in contact with lower portions of the secondary batteries 100 and absorb heat from the lower portions of the secondary batteries 100. Thereafter, the absorbed heat may be transferred from the lower filling liquid 300 to the module case 200. Therefore, although lower sides of the secondary batteries 100 are directly in contact with an inner surface of the module case 200, heat may be transferred from the secondary batteries 100 to the module case 200 through the lower filling liquid 300 in addition to the direct contact portions. Therefore, the heat conduction area between the secondary batteries 100 and the module case 200 may be increased, and thus the efficiency of heat transfer may be improved.

In particular, as shown in FIG. 1, the electrode leads 110 may be located on lateral surfaces, for example, left and right surfaces of the secondary batteries 100 in a horizontal direction but may not be located on lower surfaces of the secondary batteries 100. In this case, heat may be more easily transferred to the lower filling liquid 300 from the insides of the secondary batteries 100. Due to the internal structure of the secondary batteries 100, heat may be transferred more easily in a vertical length direction than in a thickness direction of the secondary batteries 100. For example, in the structure of the secondary batteries 100 shown in FIG. 1, vertical thermal conductivity is 30 W/m·K, and thicknesswise thermal conductivity is relatively very low at 0.8 W/m·K. Therefore, in the above-described configuration, if the lower filling liquid 300 is placed at lower sides of the secondary batteries 100, heat may move in a vertical direction, and thus heat generated in any portions of the secondary batteries 100 may be easily transferred to the lower filling liquid 300.

In addition, the lower filling liquid 300 may be in contact with all the secondary batteries 100. Thus, the lower filling liquid 300 may absorb heat from all the secondary batteries 100.

In the above-described configuration, the battery module of the present disclosure may further include a coolant pipe 500 as shown in FIG. 1. Here, the coolant pipe 500 is a hollow element having an inner space allowing a coolant such as a liquid or gas to flow therethrough. For example, the coolant pipe 500 may be a heat sink. The coolant pipe 500 may be placed under the module case 200. In addition, the coolant pipe 500 may be directly in contact with a lower surface of the module case 200.

In this configuration, heat transferred from the secondary batteries 100 to the lower portion of the module case 200 through the lower filling liquid 300 may be discharged to the outside of the battery module through the coolant pipe 500. Therefore, since heat is rapidly discharged to the outside of the battery module, the efficiency of cooling may be improved.

However, the present disclosure is not limited to this embodiment. For example, instead of providing a separate pipe under the module case 200, a coolant such as air may be directly supplied to the lower portion of the module case 200. For example, the module case 200 may be naturally cooled by air.

Furthermore, in the configuration of the battery module of the present disclosure, at least the lower portion of the module case 200 may be formed of a material having high thermal conductivity such as a metallic material. For example, at least a bottom surface of the lower case 210 may be formed of a material having high thermal conductivity such as aluminum or steel.

In addition, preferably, the upper filling liquid 400 may have specific heat higher than that of the lower filling liquid 300. In particular, the upper filling liquid 400 may include a material having a specific heat of 2000 J/kg·K or greater.

According to this configuration of the present disclosure, an increase in the temperature of the battery module may be effectively suppressed owing to the high specific heat of the upper filling liquid 400. For example, although heat is generated in the secondary batteries 100 or other elements such as a bus bar placed outside the secondary batteries 100, the temperature of the battery module may not be markedly increased owing to the upper filling liquid 400. In addition, even when heat is abnormally generated outside the battery module, or the battery module is in a high-temperature environment such as summer, heat transfer from the outside of the battery module to the secondary batteries 100 may be suppressed by the upper filling liquid 400.

Therefore, according to this configuration, a decrease in the performance of the secondary batteries 100 or damage to elements of the battery module may not be caused by a temperature increase in the inside or outside of the battery module.

In addition, preferably, the upper filling liquid 400 may have a burning point higher than that of the lower filling liquid 300. In particular, the upper filling liquid 400 may include a material having a burning point of 300° C. or higher.

According to this configuration of the present disclosure, the battery module may be effectively prevented from catching on fire owing to the high burning point of the upper filling liquid 400. For example, even when a large amount of heat is generated inside and outside the secondary batteries 100, the upper filling liquid 400 having a high burning point may not be easily ignited, and thus the battery module may be prevented from catching on fire.

In addition, preferably, the upper filling liquid 400 may have a withstand voltage higher than that of the lower filling liquid 300. In particular, the upper filling liquid 400 may include a material having a withstand voltage of 70 kV or higher.

According to this configuration of the present disclosure, the battery module may be stably electrically insulated owing to the high withstand voltage of the upper filling liquid 400. In addition, the upper filling liquid 400 may be in contact with the electrode leads 110 of the secondary batteries 100 accommodated in the inner space of the module case 200. A battery pack for an electric vehicle has a high voltage for high output power. Therefore, it is preferable that the upper filling liquid 400 have a high withstand voltage for preventing an internal short circuit or the like and thus guaranteeing electrical insulative characteristics of the inside of the battery module.

Particularly, in the battery module of the present disclosure, the electrode lead 110 of a secondary battery 100, particularly, the electrode leads 110 of all the secondary batteries 100 may be entirely immersed in the upper filling liquid 400. That is, in a state in which the upper filling liquid 400 is filled in the module case 200, the electrode leads 110 of all the secondary batteries 100 accommodated in the module case 200 may be entirely in contact with the upper filling liquid 400 as shown in FIG. 1.

In particular, the upper filling liquid 400 may have a high withstand voltage. Therefore, according to this configuration of the present disclosure, since the electrode leads 110 of the secondary batteries 100 are mainly in contact with the upper filling liquid 400 having a high withstand voltage, electrical insulation between the electrode leads 110 may be more stably guaranteed.

The upper filling liquid 400 may surround upper and lateral peripheries of a secondary battery 100. In particular, the upper filling liquid 400 may be in contact with upper and lateral portions of all the secondary batteries 100 accommodated in the module case 200. Therefore, the upper filling liquid 400 may suppress the occurrence of a temperature increase, fires, and/or electrical insulation breakdown in all the secondary batteries 100, thereby effectively guaranteeing the safety of the battery module.

In addition, the upper filling liquid 400 and the lower filling liquid 300 may be moved in the inner space of the module case 200 because of characteristics of liquid when the battery module is moved, impacted, or vibrated. Therefore, according to situations, the electrode leads 110 of the secondary batteries 100 may be in contact with the lower filling liquid 300 as well as the upper filling liquid 400. Therefore, both the upper filling liquid 400 and the lower filling liquid 300 may include an electrically insulative material.

In particular, the upper filling liquid 400 or both the upper filling liquid 400 and the lower filling liquid 300 may include insulation oil. For example, the upper filling liquid 400 may include vegetable insulation oil. In particular, the vegetable insulation oil may include a vegetable ester. Here, the vegetable ester may be obtained by esterification of a natural plant group such as beans, for example, by esterification of natural soybean oil. The natural soybean oil may include fat and oil in an amount of about 18% to 20% and a fatty acid in an amount of about 80%. The upper filling liquid 400 may include vegetable insulation oil in which a vegetable ester is contained by esterification of natural soybean oil.

According to this configuration of the present disclosure, when the battery module is manufactured or discarded, environmental pollution may be prevented, and hazards to humans may be prevented. In addition, owing to the ecofriendly vegetable insulation oil that is harmless to humans and included in the upper filling liquid 400, it may be easy to impart a high specific heat, a high burning point, and/or a high withstand voltage to the upper filling liquid 400.

In addition, the lower filling liquid 300 may include distilled water. Since distilled water is electrically insulative and has a specific gravity greater than insulation oil, distilled water may be easily placed in the lower portion of the module case 200. Since distilled water has high thermal conductivity, heat may be rapidly smoothly transferred from the secondary batteries 100 to the module case 200 through distilled water, and thus the cooling performance of the battery module may be stably guaranteed.

As described above, according to the embodiment of the present disclosure, since the upper filling liquid 400 has a high specific heat, a high burning point, and/or a high withstand voltage, the battery module may be prevented from increasing in temperature or catching on fire, and the electrical insulation of the battery module may be guaranteed. Therefore, according to this aspect of the present disclosure, the safety of the battery module may be improved owing to the upper filling liquid 400.

In addition, the amount of the upper filling liquid 400 filled in the module case 200 may be greater than the amount of the lower filling liquid 300 filled in the module case 200. For example, the amount of the upper filling liquid 400 may be equal to or greater than 80% of a total filling liquid. In particular, about 70% or more of the areas of the secondary batteries 100 may be in contact with the upper filling liquid 400. Therefore, since the battery module of the present disclosure includes the upper filling liquid 400 in a sufficient amount, the safety of the battery module may be more effectively improved.

Although the lower filling liquid 300 is included in a smaller amount than the upper filling liquid 400, heat of all the secondary batteries 100 may be discharged to a lower portion of the battery module, and thus cooling may be efficiently performed.

The inner space of the module case 200 may be filled up with the lower filling liquid 300 and the upper filling liquid 400.

For example, as shown in FIG. 1, the inner space of the module case 200 may be filled up with the upper filling liquid 400 and the lower filling liquid 300 without any remaining empty space.

According to this configuration of the present disclosure, movements of the upper filling liquid 400 and the lower filling liquid 300 may be restricted, and thus the positions of the upper filling liquid 400 and the lower filling liquid 300 may be maintained as stable as possible. In addition, since a sufficient amount of the upper filling liquid 400 is placed around the secondary batteries 100, the safety of the secondary batteries 100 from a temperature increase or fires may be guaranteed by the upper filling liquid 400. In addition, the upper filling liquid 400 may be stably on the electrode leads 110 of the secondary batteries 100, and thus the electrode leads 110 may be securely insulated.

Figure 3:
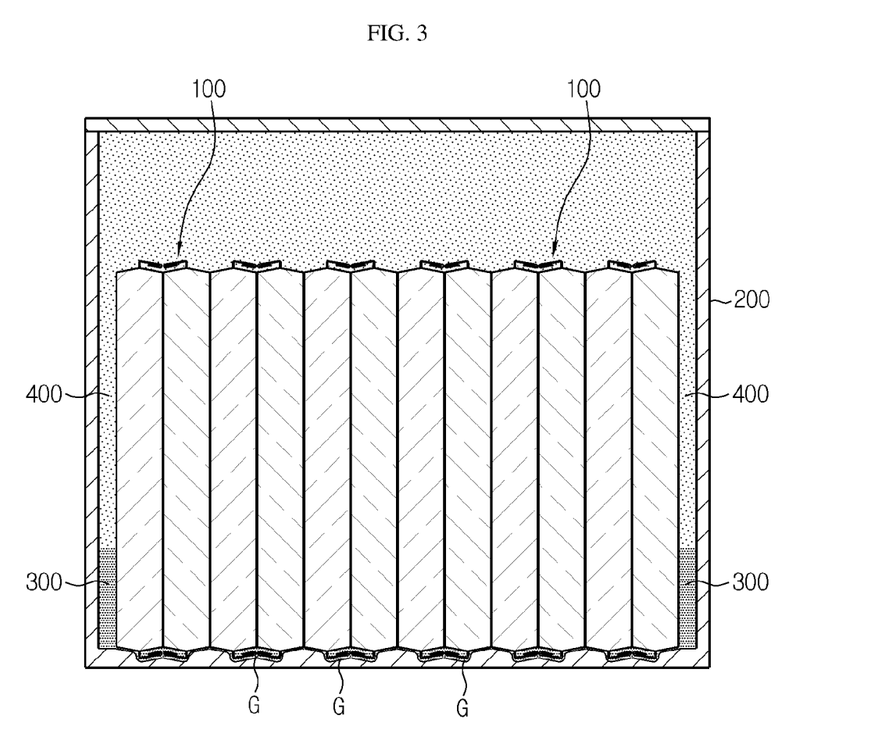
FIG. 3 is a front cross-sectional view schematically illustrating a configuration of the battery module according to an embodiment of the present disclosure.

FIG. 3 is a front cross-sectional view schematically illustrating a configuration of the battery module according to an embodiment of the present disclosure. FIG. 3 may illustrate an example cross-section taken along line A1-A1' of the configuration of FIG. 2 when the secondary batteries 100, the lower filling liquid 300, and the upper filling liquid 400 are accommodated in the module case 200.

Referring to FIG. 3, the secondary batteries 100 may be stacked in such a manner that adjacent secondary batteries 100 face each other and make contact with each other. That is, the secondary batteries 100 may be placed in a vertically standing posture and arranged side by side in a left-to-right direction in a state in which large surfaces of adjacent secondary batteries 100 are directly in contact with each other.

According to this configuration of the present disclosure, the same space may include as many secondary batteries 100 as possible. Therefore, the energy density of the battery module may be improved. In particular, according to an aspect of the present disclosure, heat may be discharged from the secondary batteries 100 to the outside through the lower filling liquid 300 making contact with the lower portion of each of the secondary batteries 100. Therefore, plate-shaped cooling fins placed between secondary batteries 100 of a battery module of the related art are not necessary. Thus, it is possible to increase the number of the secondary batteries 100 or reduce the volume of the battery module to an extent corresponding to the thickness of such cooling fins.

In addition, referring to FIG. 3, the secondary batteries 100 may stand in direct contact with a lower surface of the inner space of the module case 200, that is, a bottom surface of the inner space of the module case 200. In this case, a concave-convex structure corresponding to the shape of the secondary batteries 100 may be formed on an upper portion of the bottom of the module case 200.

In particular, lower sealing portions of the secondary batteries 100 may be folded in at least one direction. In this case, the folded lower sealing portions may be inserted into concave portions as indicated by G in the drawings. In this case, since the secondary batteries 100 are closely placed on the bottom surface of the module case 200, the amount and speed of heat transfer from the secondary batteries 100 to the bottom surface of the module case 200 may be increased.

Instead of making the secondary batteries 100 stand in direct contact with the bottom surface of the module case 200, the secondary batteries 100 may be stood by supporting the secondary batteries 100 using other components such as cartridges.

Figure 4:
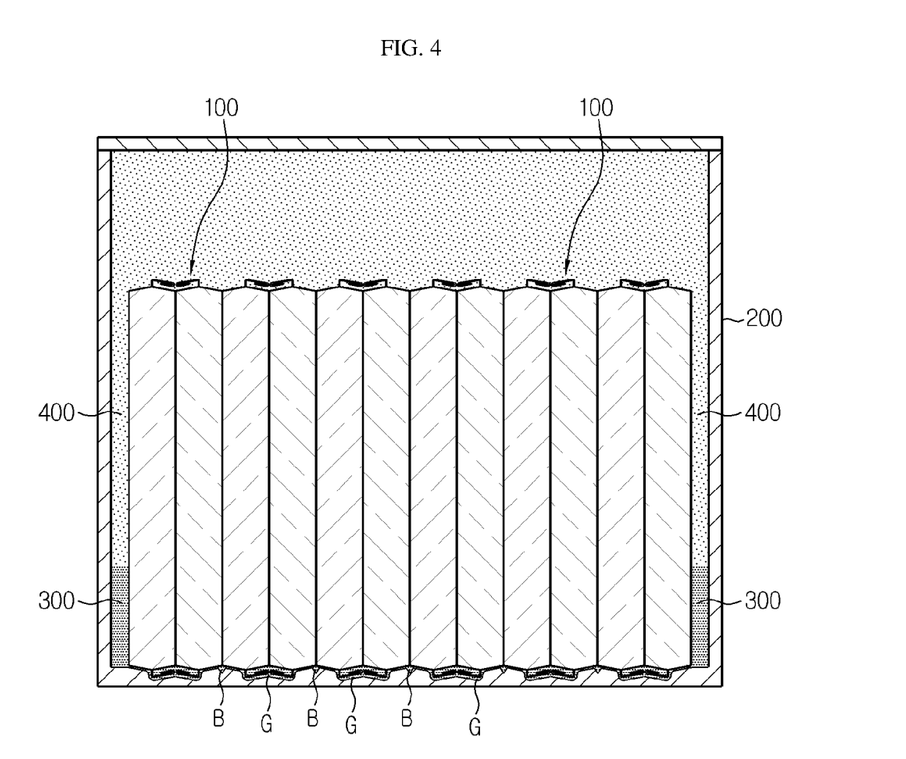
FIG. 4 is a front cross-sectional view schematically illustrating a configuration of a battery module according to another embodiment of the present disclosure.

FIG. 4 is a front cross-sectional view schematically illustrating a configuration of a battery module according to another embodiment of the present disclosure. FIG. 4 may illustrate a modification of the configuration shown in FIG. 3.

Referring to FIG. 4, an introduction groove having a downwardly recessed shape may be formed in a bottom surface of a module case 200 as indicated by B. The introduction groove B may lengthily extend in the length direction of a secondary battery 100. For example, when each secondary battery 100 stands in such a manner that the secondary battery 100 lengthily extends in a front-to-rear direction of the battery module, the introduction groove B may also be formed in a shape lengthily extending in the front-to-rear direction of the battery module. Then, a lower filling liquid 300 may be introduced into and filled in the introduction groove B of the module case 200.

Here, the introduction groove B in which the lower filling liquid 300 is filled may be provided independently of a concave portion G into which a lower sealing portion of the secondary battery 100 is inserted, particularly, a folded sealing portion of the secondary battery 100 is inserted. That is, the module case 200 may include the introduction groove B independently of the concave portion G in which the sealing portion is inserted, so as to fill only the lower filling liquid 300 in the introduction groove B without inserting the sealing portion into the introduction groove B. Therefore, since the role of the introduction groove B is to provide a path in which only the lower filling liquid 300 flows, and it is not necessary to insert the sealing portion into the introduction groove B, the introduction groove B may have a size such as a depth or width smaller than that of the concave portion G.

In addition, the introduction groove B filled with the lower filling liquid 300 may have a length longer than at least the length of the secondary battery 100. That is, the introduction groove B may have a front-to-rear length longer than that of the secondary battery 100. In this case, when the battery module is viewed in an up-to-down direction, the introduction groove may be exposed at front and rear sides of the secondary battery 100. Therefore, the lower filling liquid 300 may be introduced into the introduction groove through the front and rear sides of the secondary battery 100 and may spread along the introduction groove.

According to this configuration of the present disclosure, the lower filling liquid 300 may move along the introduction groove lengthily formed in a horizontal length direction of the secondary battery 100. Therefore, the lower filling liquid 300 may spread widely to the entire lower portion of the secondary battery 100. Thus, the cooling efficiency of the secondary battery 100 may be further improved owing to the lower filling liquid 300, and air may be maximally removed from a gap between the secondary battery 100 and the bottom surface of the module case 200.

Figure 5:
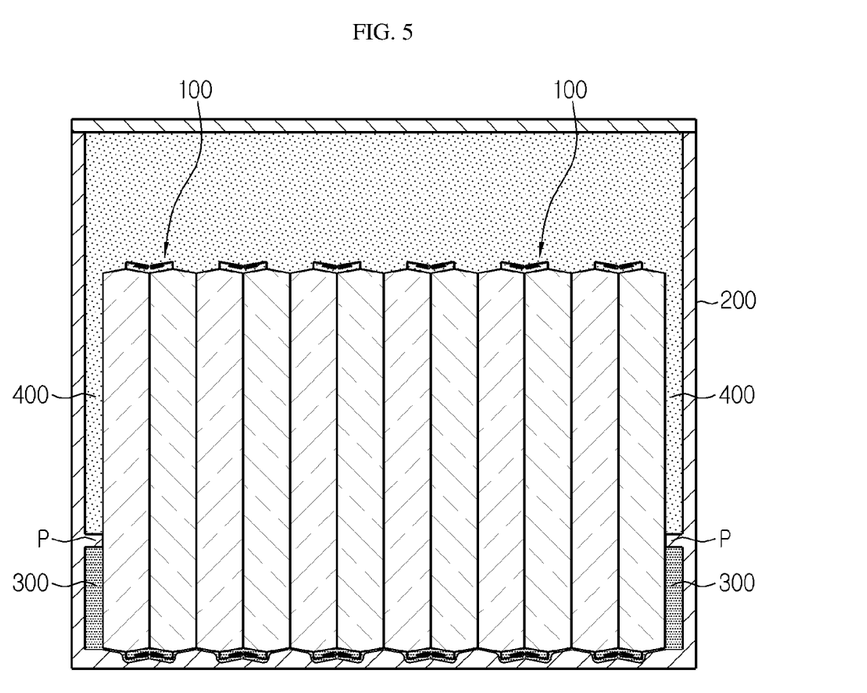
FIG. 5 is a front cross-sectional view schematically illustrating a configuration of a battery module according to another embodiment of the present disclosure.

FIG. 5 is a front cross-sectional view schematically illustrating a configuration of a battery module according to another embodiment of the present disclosure. FIG. 5 may illustrate a modification of the configuration shown in FIG. 3.

Referring to FIG. 5, a module case 200 may include a boundary protrusion formed on an inner lateral surface in an inwardly convex shape as indicated by P. In particular, the boundary protrusion P may be located on a boundary between a lower filling liquid 300 and an upper filling liquid 400. In this case, the upper filling liquid 400 may be above the boundary protrusion P, and the lower filling liquid 300 may be below the boundary protrusion P.

According to this configuration of the present disclosure, the boundary between the lower filling liquid 300 and the upper filling liquid 400 may be securely defined by the boundary protrusion P. Therefore, the positions of the lower filling liquid 300 and the upper filling liquid 400 may be more stably maintained. That is, the boundary protrusion P may restrain the lower filling liquid 300 and the upper filling liquid 400 from moving into each other. Therefore, in this case, characteristics of the lower filling liquid 300 and the upper filling liquid 400 may be respectively shown in a more effective manner.

In addition, the boundary protrusion P may be in contact with lateral surfaces of outermost secondary batteries 100. That is, when a plurality of secondary batteries 100 are arranged side by side in a left-to-right direction, the boundary protrusion P may be formed on left and right inner portions of the module case 200 and may be in contact with the leftmost secondary battery 100 and the rightmost secondary battery 100.

According to this embodiment of the present disclosure, movements of the lower filling liquid 300 and the upper filling liquid 400 on outer sides of the outermost secondary batteries 100 may be securely suppressed by the boundary protrusion P.

A battery pack of the present disclosure may include at least one battery module of the present disclosure. In addition to the battery module, the battery pack of the present disclosure may further include a pack case for accommodating the battery module and devices for controlling charge and discharge operations of the battery module such as a battery management system (BMS), a current sensor, or a fuse.

The battery module of the present disclosure may be applied automobiles such as electric vehicles or hybrid vehicles. That is, an automobile of the present disclosure may include the battery module of the present disclosure. In particular, middle to large-sized battery modules for electric vehicles or hybrid vehicles generally include many secondary batteries, and each of the secondary batteries generally has a high output current level. Therefore, it is possible to more effectively guarantee the cooling performance and safety of an automotive battery pack to which the battery module of the present disclosure is applied.

Furthermore, in the present disclosure, terms indicating directions such as upward, downward, leftward, rightward, forward, and backward are used, but these terms are for ease of description. It will be apparent to those skilled in the art that these terms can vary depending on the position of an object or an observer.

While some embodiments of the present disclosure has been described with reference to the accompanying drawings, it should be understood that the embodiments are given by way of illustration only, and various changes and modifications within the scope of the disclosure as defined by the appended claims will become apparent to those skilled in the art.

What is claimed is:

1. A battery module comprising:
   a plurality of pouch-type secondary batteries standing in a vertical direction and stacked in a horizontal direction;
   a module case configured to accommodate the plurality of secondary batteries in an inner space thereof;
   a lower filling liquid filled in a lower region of the inner space of the module case and making contact with at least lower portions of the plurality of secondary batteries; and
   an upper filling liquid having a specific gravity less than a specific gravity of the lower filling liquid and filled in the inner space of the module case above the lower filling liquid,
   wherein the lower and upper filling liquids occupy respective lower and upper layers in the inner space of the module case.

2. The battery module of claim 1, wherein the lower filling liquid has a thermal conductivity higher than a thermal conductivity of the upper filling liquid.

3. The battery module of claim 2, wherein the lower filling liquid has a thermal conductivity of 0.5 W/m·K or greater.

4. The battery module of claim 1, wherein the upper filling liquid has a specific heat greater than a specific heat of the lower filling liquid.

5. The battery module of claim 4, wherein the upper filling liquid has a specific heat of 2000 J/kg·K or greater.

6. The battery module of claim 1, wherein the upper filling liquid has a burning point higher than a burning point of the lower filling liquid.

7. The battery module of claim 6, wherein the upper filling liquid has a burning point of 300° C. or higher.

8. The battery module of claim 1, wherein the upper filling liquid has a withstand voltage higher than a withstand voltage of the lower filling liquid.

9. The battery module of claim 8, wherein electrode leads of the secondary batteries are entirely immersed in the upper filling liquid.

10. The battery module of claim 1, wherein the secondary batteries are stacked in such a manner that adjacent secondary batteries face each other and make contact with each other.

11. The battery module of claim 1, wherein an introduction groove lengthily extending in a length direction of the secondary batteries is formed in a bottom surface of the module case, and the lower filling liquid is filled in the introduction groove of the module case.

12. The battery module of claim 1, wherein the module case comprises a boundary protrusion formed on an inner lateral surface in an inwardly convex shape, and the boundary protrusion is located on a boundary between the lower filling liquid and the upper filling liquid.

13. A battery pack comprising the battery module of claim 1.

14. An automobile comprising the battery module of claim 1.

15. A battery module, comprising:
   a plurality of pouch-type secondary batteries standing in a vertical direction and stacked in a horizontal direction;
   a module case configured to accommodate the plurality of secondary batteries in an inner space thereof;
   a lower filling liquid filled in a lower region of the inner space of the module case and making contact with at least lower portions of the plurality of secondary batteries; and
   an upper filling liquid having a specific gravity less than a specific gravity of the lower filling liquid and filled in the inner space of the module case above the lower filling liquid,
   wherein the module case comprises a boundary protrusion formed on an inner lateral surface in an inwardly convex shape, and the boundary protrusion is located on a boundary between the lower filling liquid and the upper filling liquid.

* * * * *